United States Patent
Lisac et al.

(10) Patent No.: US 9,598,317 B2
(45) Date of Patent: Mar. 21, 2017

(54) TERNARY BINDER SYSTEM

(71) Applicant: UZIN UTZ AG, Ulm (DE)

(72) Inventors: Peter Lisac, Ulm (DE); Christian Sagmeister, Ulm (DE); Markus Gretz, Ulm (DE); Johannis Tsalos, Ulm (DE)

(73) Assignee: UZIN UTZ AG, Ulm (DE)

( * ) Notice: Subject to any disclaimer, the term of this patent is extended or adjusted under 35 U.S.C. 154(b) by 105 days.

(21) Appl. No.: 14/631,912

(22) Filed: Feb. 26, 2015

(65) Prior Publication Data
US 2015/0284292 A1 Oct. 8, 2015

(30) Foreign Application Priority Data

Feb. 26, 2014 (EP) .................................. 14156790

(51) Int. Cl.
| | | |
|---|---|---|
| C04B 28/06 | (2006.01) | |
| C04B 28/14 | (2006.01) | |
| C04B 7/32 | (2006.01) | |
| C04B 111/00 | (2006.01) | |
| C04B 111/60 | (2006.01) | |

(52) U.S. Cl.
CPC .............. C04B 28/065 (2013.01); C04B 7/32 (2013.01); C04B 28/06 (2013.01); C04B 28/14 (2013.01); C04B 2111/00215 (2013.01); C04B 2111/00637 (2013.01); C04B 2111/00672 (2013.01); C04B 2111/60 (2013.01)

(58) Field of Classification Search
CPC ......... C04B 28/065; C04B 7/32; C04B 28/06; C04B 28/14
See application file for complete search history.

(56) References Cited

U.S. PATENT DOCUMENTS

| | | |
|---|---|---|
| 3,973,978 A | 8/1976 | Nakagawa et al. |
| 4,259,121 A | 3/1981 | Mathieu |
| 7,208,040 B2 | 4/2007 | Amathieu et al. |
| 2006/0118006 A1* | 6/2006 | Amathieu ............... C04B 7/323 106/611 |

FOREIGN PATENT DOCUMENTS

EP 0213390 3/1987

OTHER PUBLICATIONS

European Search Report corresponding to European Patent Application No. 14156790.9 dated Jul. 7, 2014.
Pelletier et al., "The ternary system Portland cement-calcium sulphoaluminate clinker-anhydrite: Hydration mechanism and mortar properties," Cement & Concrete Composites, vol. 32, pp. 497-507 (2010).

* cited by examiner

*Primary Examiner* — John Uselding
(74) *Attorney, Agent, or Firm* — Jenkins, Wilson, Taylor & Hunt, P.A.

(57) ABSTRACT

A mineral binder system that includes a mineral binder B1 of calcium aluminates having a ratio C/A of calcium oxide C to aluminum oxide A of 0.7 to 1.1, a mineral binder B2 of calcium aluminates having a ratio C/A of calcium oxide C to aluminum oxide A of 1.2 to 2.7, and at least one sulfate carrier is provided. Also provided are a dry mortar which includes this mineral binder system, a wet mortar based on the disclosed dry mortar, and the use of the dry mortar as tile adhesive mortar, levelling compound, waterproofing slurry, grout mortar, screed binder, screed mortar, repair adhesive, and/or damp proof membrane.

20 Claims, 3 Drawing Sheets

TERNARY BINDER SYSTEM

CROSS REFERENCE TO RELATED APPLICATION

The present application claims priority to European Patent Application Serial No. 14156790.9, filed Feb. 26, 2014, the content of which is incorporated by reference in its entirety.

TECHNICAL FIELD

The presently disclosed subject matter relates to mineral binder systems. Particularly, the presently disclosed subject matter provides mineral binds systems comprising a mineral binder B1 of calcium aluminates, having a ratio C/A of calcium oxide C to aluminum oxide A of 0.7 to 1.1 , a mineral binder B2 of calcium aluminates, having a ratio C/A of calcium oxide C to aluminum oxide A of 1.2 to 2.7, and at least one sulfate carrier. Also provided are dry mortars which comprise the presently disclosed mineral binder systems, dry mortars prepared by mixing and based on the presently disclosed dry mortars, and to the use of the presently disclosed dry mortars as tile adhesive mortars, levelling compounds, waterproofing slurries, grout mortars, screed binders, screed mortars, repair adhesives, and/or damp proof membranes.

BACKGROUND

For various applications in the field of the production and use of cement, a variety of mortar systems are provided, it being possible for a distinction to be made between, for example, two-component and one-component dry mortar systems. With regard to the use of two-component (2 K) dry mortar systems, there is a risk of mixing errors, since the two components of the dry mortar system are formulated specifically for specific mixing ratios. For specialist applications (e.g., cementitious seals in assembly), the mortar systems used include cementitious one-component (1 K) dry mortar systems having a high polymer fraction (>20, in some cases up to 40 wt %). Such one-component dry mortar systems are powder products which are formulated at the production works and which, prior to application, are prepared by mixing with water, giving them a workable consistency.

The polymers used are, generally, redispersible dispersion powders, polymer fibers, methylcelluloses, starch ethers, dispersants, and/or polymers with a thickening action. The high fraction of polymers is a result, for example, of the specific technical requirements imposed on such one-component waterproofing systems, as are required for water-impermeable products, intended for liquid working, in assembly before sticking ceramic tiles (e.g., DIN EN 14891).

It is known in this context that a high polymer content on the part of cementitious mortar systems leads to disruptions to the hydration profile (hardening) and/or to the kinetics of setting. As a result of the composition of the polymers (specifically monomers) and their additization, there is generally a significant influence on the reactivity of the cementitious binder components. The hardening of cementitious binder systems is generally accompanied by formation of what are called hydrate phases, owing to processes of dissolution and recrystallization. Water is bound chemically in the hydrate phases formed. The microstructure of the crystalline hydration products is responsible for the strength, and development of strength, of cementitious binder systems.

For the working properties of such one-component waterproofing slurries, for example, it is important, moreover, to enable an appropriate working time. The working time here is understood as the period between contacting of the dry mortar with water and the time at which the mortar can no longer be reliably worked, in other words until it loses its workable consistency as a result of the ensuing reaction. At the end of the working time, the hydration products that form begin to develop the microstructure, and the product can no longer be reliably worked.

An appropriate working time may generally be set using various chemical additions (including fruit acids, phosphates, etc.). These additions, however, may likewise have adverse consequences for the setting reaction and for the subsequent hydration profile. The retardant effect of such additions derives, for example, from the complexing of particular reactants (in general, polyvalent ions), which are then no longer available for the formation of hydration products in the course of hardening.

For example, there are known cementitious 1 K mortar formulations (including waterproofing slurry systems) which have a polymer fraction >20 wt %. These systems include, firstly, pure Portland cement-based systems (OPC systems) having a polymer fraction of up to about 30 wt %. Such systems do have very long working times (>4 hours), but only in conjunction with a very slow curing (>4 hours), which is untenable in practice. Known, secondly, are products which are based on ternary binder systems consisting of Portland cement (OPC; principal binder), high-alumina cement (HAC) and a sulfate carrier. These systems as well have a polymer fraction >20 wt % and up to 40 wt %. A disadvantage with such systems is often the short working time (about 30 minutes) which is untenable in practice for a sufficiently short cure time.

Also known is an innovative high-alumina cement (ettringite former) for binary binder systems (HAC+sulfate carrier), with the particular advantage that the use of Portland cement in the formulation is superfluous, the special reactivity of a binder system of this kind being described in FR2839066 (page 10/11) and DE60304041 (page 7/8).

Also known are guide formulations from raw materials manufacturers for cementitious 1 K mortar systems, with the focus on waterproofing slurries.

For example, a guide formulation from BASF (25.07.2011) describes a ternary binder system based on OPC (principal constituent), HAC, and sulfate carrier. The polymer fraction here is about 33 wt %. The dispersion powder used is a powder based on a copolymer of an acrylic ester and styrene. Disadvantages associated with this guide formulation, however, are the late foot-traffic accessibility and the long period before application of a second coat, especially at low temperatures and high humidity, and also a too short working time at high temperatures.

Thus, disclosed herein are improved binder systems and dry mortars featuring improved setting characteristics.

SUMMARY

It has been found that a hydration reaction can be achieved with a preferably Portland cement-free, ternary binder system comprising two different high-alumina cements plus a sulfate carrier, in cementitious 1 K mortar formulations with a high polymer content, meaning that hardening occurs not predominantly by physical drying but instead through a chemical reaction. It is possible, furthermore, to control the working time almost independently of the hardening time, and to set it at a practical level.

According to one aspect, the presently disclosed subject matter relates to a mineral binder system, or mineral combination of binders, comprising i) a mineral binder B1 of calcium aluminates, having a ratio C/A of calcium oxide C to aluminum oxide A of 0.7 to 1.1;

ii) a mineral binder B2 of calcium aluminates, having a ratio C/A of calcium oxide C to aluminum oxide A of 1.2 to 2.7; and iii) at least one sulfate carrier.

According to a further aspect, the presently disclosed subject matter further relates to a dry mortar comprising a mineral binder system of the presently disclosed subject matter, polymers, and optionally fillers and/or rheological additives.

The presently disclosed subject matter further relates to a dry mortar prepared by mixing and comprising the dry mortar of the presently disclosed subject matter, water, and optionally sand, and also to the use of the dry mortar of the presently disclosed subject matter as—preferably one-component—the adhesive mortar levelling compound, waterproofing slurry, grout mortar, screed binder, screed mortar, repair adhesive and/or damp proof membrane.

Surprisingly it has been found that by virtue of the innovative binder combination in conjunction with a polymer fraction >20 and up to 35-50 wt %, it is possible to achieve a sufficiently rapid hydration reaction, allowing a distinct reduction in the waiting times prior to foot-traffic time (e.g., 2 hours) and reworking (e.g., 2.5 hours) relative to comparative systems. The proposed binder formulation further enables a sufficiently long working time to be set (e.g., 50 minutes). There is also an improvement in the reactivity under adverse ambient conditions (low temperature, e.g., ≤10° C., high humidity, e.g., ≥80%). Relative to comparative systems, the foot-traffic accessibility (e.g., after 2 h at 23° C. and 50% relative humidity) and the reworkability (e.g., 2.5 h at 23° C. and 50% relative humidity) are attained earlier. The hydration reaction of cementitious mortar formulations here is heavily dependent on the ambient conditions, and low temperatures and high humidities generally lead, for example, to a slowing of the setting process.

Further aspects of the presently disclosed subject matter are apparent from the dependent claims and from the detailed description.

BRIEF DESCRIPTION OF THE FIGURES

The appended drawings are intended to illustrate embodiments of the presently disclosed subject matter and to impart a further understanding thereof. Together with the description, they serve to explain concepts and principles of the presently disclosed subject matter. Other embodiments and many of the stated advantages are apparent from the drawings. The elements in the drawings are not necessarily shown in scale with one another. Identical, functionally identical and actively identical elements, features and components are provided in each case with the same reference symbols in the figures of the drawings, unless otherwise stated.

DETAILED DESCRIPTION

Figure 1:
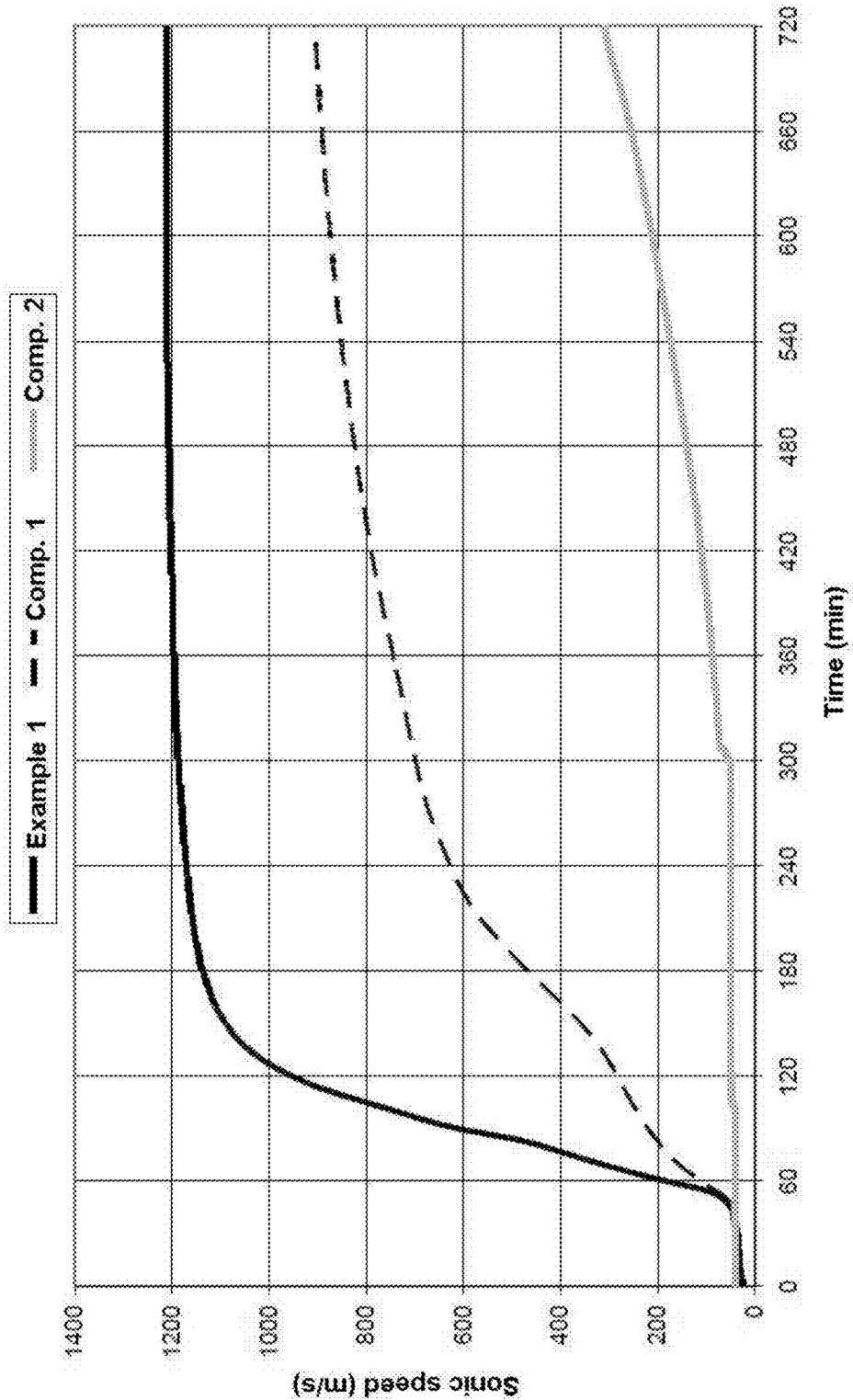
FIG. 1 shows the results of ultrasound investigations on the hardening profile of Inventive Example 1 (black line) in relation to Comparative 1 (dashed line) and Comparative 2 (gray line).

The presently disclosed subject matter, according to some embodiments, is directed to a mineral binder system, or a mineral combination of different binders, comprising i) a mineral binder B1 of calcium aluminates, having a ratio C/A of calcium oxide C to aluminum oxide A of 0.7 to 1.1, preferably of 0.8 to 1.05;

ii) a mineral binder B2 of calcium aluminates, having a ratio C/A of calcium oxide C to aluminum oxide A of 1.2 to 2.7, preferably of 1.4 to 2.0; and iii) at least one sulfate carrier.

The ratio C/A here represents the molar ratio within the respective binder between calcium oxide C and aluminum oxide A.

According to particular embodiments, the sum of the weight of the utilizable phases (C+A) in the mineral binder B2 accounts for at least 30% of the total weight of the mineral binder B2.

The mineral binder system of the presently disclosed subject matter therefore consists, for example, of a combination of a conventional and of an innovative high-alumina cement (HAC) and a sulfate carrier. A mineral binder is a binder which comprises at least one mineral component. A high-alumina cement here is a binder produced from bauxite and limestone by sintering and/or melting, for example at 1500-1600° C. The composition, requirements and conformity criteria for high-alumina cements/alumina cements may be found in, for example, DIN EN 14647:2005.

According to particular embodiments, the sulfate carrier comprises at least one gypsum modification, preferably calcium sulfate dihydrate, calcium sulfate α-hemihydrate, calcium sulfate β-hemihydrate and/or anhydrite.

According to particular embodiments, the mineral binder B1 comprises calcium oxide CaO in an amount of 30 to 42 wt %, preferably 33 to 40 wt %, more preferably 35 to 39 wt %, based on the mineral binder B1, which comprises 100 wt %. In the mineral binder B1, moreover, there is preferably a fraction of iron oxide $Fe_2O_3$ of 10 to 25 wt %, preferably 12 to 20 wt %, more preferably 14 to 18 wt %, based on the mineral binder B1, which affects the color and the density of the mineral binder B1 and also of the mineral binder system. In addition there may be, for example, SiO2 in an amount of 1 to 10 wt %, preferably 2 to 7 wt %, more preferably 3 to 6 wt %, based on the mineral binder B1. According to particular embodiments, the binder B1 comprises $Al_2O_3$ in an amount of 35 to 45 wt %, preferably 37 to 43 wt %, more preferably 38 to 42 wt %, based on the mineral binder B1. The principal clinker phase of the binder B1 is preferably CA ($CaO.Al_2O_3$).

According to particular embodiments, the mineral binder B2 comprises calcium oxide in an amount of 45 to 65 wt %, preferably 46 to 55 wt %, more preferably 47 to 52 wt %, based on the mineral binder B2, which comprises 100 wt %. In the mineral binder B2, moreover, there is preferably a fraction of iron oxide $Fe_2O_3$ of 4 to 10 wt %, preferably 5 to 9.5 wt %, more preferably 5 to 9 wt %, based on the mineral binder B2, which affects the color and the density of the mineral binder B2 and also of the mineral binder system. In addition there may be, for example, SiO2 in an amount of 1 to 10 wt %, preferably 2 to 7 wt %, more preferably 3 to 6.5 wt %, based on the mineral binder B2. According to particular embodiments, the binder B2 comprises $Al_2O_3$ in an amount of 30 to 40 wt %, preferably 33 to 38 wt %, more preferably 33.5-37.5 wt %, based on the mineral binder B1. The principal clinker phase of the binder B2 is preferably $C_{12}A_7$. According to particular embodiments, the binders B1 and B2 are ettringite-forming binders.

Example binders B1 and B2 are indicated in Table 1 as HAC 1 and HAC 2, along with Portland cement as a comparative, the figures being reported in wt %.

The high-alumina cements shown in Table 1 and also used in the inventive and comparative examples, and the Portland cement (OPC) used in the comparative examples, differ in their chemical/mineralogical composition. The composition of the high-alumina cements is contrasted in Table 1. Relative to HAC 1, HAC 2 has an increased CaO fraction in conjunction with a reduced Al$_2$O$_3$ content. The Portland cement (OPC), apart from different levels of Al$_2$O$_3$, CaO, SiO$_2$ and Fe$_2$O$_3$, additionally has SO$_3$ as an essential component. In Table 1, the weight figures add up to 100 wt %; in addition there may be at most 5 wt % of further constituents in the high-alumina cements HAC 1 and HAC 2 and in the Portland cement (OPC).

TABLE 1

Chemical/mineralogical Composition of the High-alumina Cements (HAC) Used, and of Portland Cement for Comparison

|  |  | HAC 1 | HAC 2 | OPC |
|---|---|---|---|---|
| Chemical composition | Al$_2$O$_3$ | 38-41 | 33.5-37.5 | 3.5-6.5 |
|  | CaO | 35.3-37.9 | 47.5-50.5 | 60-68 |
|  | SiO$_2$ | 3.5-5 | 3.6-6 | 18-23 |
|  | Fe$_2$O$_3$ | 14.5-17.5 | 6.5-9 | 1.0-4.5 |
|  | SO$_3$ |  |  | 2.5-4.5 |
| Mineral composition | Principal clinker phase | CA | C$_{12}$A$_7$ | C$_3$S, C$_2$S |
|  | Active C/A | 1 | 1.77 |  |

HAC 1 is a "conventional" high-alumina cement having an Al$_2$O$_3$ fraction of about 40%. High-alumina cements of this kind are available from various manufacturers. The principal clinker phase in such cements is CA (CaO.Al$_2$O$_3$).

For the formation of ettringite as the principal product of hydration, according to the following reaction, there must be Ca$^{2+}$ and SO$_4^{2-}$ ions as well as dissolved Al$^{3+}$ ions:

$$6Ca^{2+}+2Al(OH)_4^-+3SO_4^{2-}+4OH^-+26H_2O \rightarrow$$
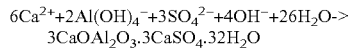
$$3CaOAl_2O_3.3CaSO_4.32H_2O$$

In conventional HAC-based binder systems, the SO$_4^{2-}$ and Ca$^{2+}$ ions needed for ettringite formation are provided by formulation with sulfate carriers (dihydrate, hemihydrate, anhydrite) and/or Portland cement (OPC). The systems in question are commonly the ternary binder systems known from the prior art. Via the ratio of the binders to one another it is possible to direct the properties of mortar formulations (working properties, physical properties) over a wide range.

HAC 2 is an innovative high-alumina cement with an increased fraction of CaO. This is evident in particular in the ratio C/A (CaO/Al$_2$O$_3$). Relative to HAC 1, HAC 2 has an increased CaO fraction. At the same time the Al$_2$O$_3$ content is reduced by comparison with HAC 1. Because of this, this binder requires only one additional sulfate source (dihydrate, hemihydrate, anhydrite) for formation of ettringite. The required concentration of dissolved and rapidly available Ca$^{2+}$ is provided by HAC 2, in contrast to the formation of ettringite with HAC 1.

According to preferred embodiments, the mineral binder system or mineral binder combination is free from Portland cement.

According to particular embodiments, the mineral binder system comprises 40 to 80 wt %, preferably 40 to 75 wt % and more preferably 40 to 70 wt %, of the mineral binder B1 and/or 10 to 40 wt %, preferably 20 to 40 wt %, of the mineral binder B2 and/or 10 to 20 wt % of the sulfate carrier, based on the total weight of the mineral binder system, the total weight of mineral binder B1 and mineral binder B2 and sulfate carrier accounting for not more than 100 wt %.

A production method for producing the mineral binder system of the presently disclosed subject matter may comprise, for example, a step of providing the mineral binder B1 of calcium aluminates, having a ratio C/A of calcium oxide C to aluminum oxide A of 0.7 to 1.1, preferably of 0.8 to 1.05, the mineral binder B2 of calcium aluminates, having a ratio C/A of calcium oxide C to aluminum oxide A of 1.2 to 2.7, preferably of 1.4 to 2.0, hat, and the at least one sulfate carrier, optionally a step of weighing out the initial components, and then a step of mixing the components.

According to a further aspect, the presently disclosed subject matter further relates to a dry mortar comprising at least one mineral binder system as disclosed herein, polymers, and optionally fillers and/or rheological additives. Fillers and/or rheological additives may be present with a fraction of up to 60 wt %, preferably up to 55 wt %, more preferably up to 50 wt %, very preferably up to 45 wt %, based on 100 wt % of the dry mortar.

According to particular embodiments, the dry mortar of the presently disclosed subject matter has a polymer fraction in the dry mortar of at least 20 wt %, preferably of at least 25 wt %, more preferably of at least 30 wt %, more preferably of at least 35 wt %, based on the dry mortar. According to particular embodiments, the polymer fraction may comprise up to 50 wt %, preferably up to 45 wt %, more preferably up to 40 wt %, based on the dry mortar, in terms of polymers. The polymer fraction in these cases may comprise, for example, dispersion powders and/or thickeners and/or working auxiliaries that are commonly used. Polymers are used preferably as dispersion powders and/or thickeners and/or working assistants.

According to particular embodiments, in the dry mortar of the presently disclosed subject matter, there may be up to 50 wt %, preferably up to 45 wt %, more preferably up to 40 wt %, with further preference up to 35 wt %, based on the dry mortar system, of at least one redispersible polymer dispersion powder as polymer. According to particular embodiments, the redispersible polymer dispersion powder may comprise a copolymer based on acrylic ester and styrene and/or a polymer based on a vinyl compound and ethylene and/or styrene-butadiene rubber (SBR).

The dry mortar of the presently disclosed subject matter can further comprise polymer fibers based on polyethylene and/or polypropylene.

The organic binder (fraction, for example, up to about 40 wt %) in the dry mortar of the presently disclosed subject matter may therefore be, for example, a redispersible dispersion powder based on a copolymer of an acrylic ester and styrene. Alternative dispersion powders used may also be polymers based on vinyl compounds (e.g., vinyl acetate) and ethylene. Furthermore, for specific use as a 1 K waterproofing slurry system, the dry mortar of the presently disclosed subject matter may for example optionally comprise polymer fibers and also other rheologically active formulating constituents (thickeners, methylcelluloses).

Rheological additives used may be, for example, viscosity regulators, retention agents such as polysaccharides, in other words macromolecular sugars whose base molecules are linked by glycosidic bonds, such as cellulose, branched starch or spherocolloidal glycogen, for example, or derivatives thereof, such as methylcelluloses, hydroxymethylcelluloses, hydroxypropylmethylcelluloses, hydroxyethyl ethers of methylcellulose, and also particular xanthans; examples of retention agents that may be used are, especially, cellulose ethers such as methylcellulose-hydroxyethylcellulose or hydroxypropylcellulose (see H. Kittel, Lehrbuch der Lacke und Beschichtungen, Volume 7, Produkte für das Bauwesen, Beschichtungen, Bauklebstoffe, Dichtstoffe, pp. 108-110, S. Hirzel Verlag Stuttgart, 2$^{nd}$ edition, 2005), and there may also be other customary thickeners included.

The dry mortar of the presently disclosed subject matter may also, furthermore, comprise further additives such as lime hydrate in an amount of up to 2 wt %, based on the dry mortar; lime hydrate may assist, for example, the filming of the dispersion powder. It may also activate the thickeners and thereby influence the rheological properties of the mortar.

Additives which can additionally be used include, for example, retarders, accelerators such as sodium phosphate, potassium phosphate, sodium phosphonate, potassium phosphonate, ammonium phosphate, ammonium phosphonate, water-soluble silicofluorides, borates, other sodium salts, sugars such as sucrose, mannose and glucose, gluconic acids and sodium salts thereof, glucono-δ-lactone, fruit acids such as citric acid, tartaric acid and malic acid and their alkali metal salts, phosphonic acids, lignosulfonate in unfermented form, EDTA, ZnO, PbO and the like as known from, for example, H. Kittel, Lehrbuch der Lacke und Beschichtungen, Volume 7, Produkte für das Bauwesen, Beschichtungen, Bauklebstoffe, Dichtstoffe, pp. 100-101, S. Hirzel Verlag Stuttgart, $2^{nd}$ edition, 2005.

According to preferred embodiments, the dry mortar of the presently disclosed subject matter is free from Portland cement.

The dry mortar of the presently disclosed subject matter may be produced, for example, by mixing a mineral binder system as disclosed herein with polymers and optionally with fillers and/or rheological additives, in accordance for example with the proportions indicated above.

According to a further aspect, the presently disclosed subject matter relates, moreover, to a dry mortar prepared by mixing, comprising a dry mortar as disclosed herein, water, and optionally sand. A dry mortar prepared by mixing here means a dry mortar which is mixed up or processed with water and optionally sand, producing in particular a workable consistency, at which the dry mortar prepared by mixing may then be applied to surfaces that are to be coated, etc. In order to produce a dry mortar prepared by mixing of this kind, the dry mortar of the presently disclosed subject matter may be suitably mixed with the water and optionally sand, using a suitable mixer device, for example.

In a further aspect, the presently disclosed subject matter relates to the use of a dry mortar as disclosed herein as—preferably one-component—the adhesive mortar, levelling compounds, waterproofing slurries, grout mortars (screed binder+sand), screed binders, screed mortars, repair adhesives and/or damp proof membrane systems. The production of the corresponding tile adhesive mortars, levelling compounds, waterproofing slurries, grout mortars, screed binders, screed mortars, repair adhesives and/or damp proof membrane systems may take place in this context in accordance with known methods and through suitable selection of the components and/or mixing proportions, provided that the dry mortar of the presently disclosed subject matter is included.

According to particular embodiments, the levelling compound is a self-levelling and sag-resistant levelling compound.

The embodiments, refinements and developments above may be combined with one another arbitrarily in accordance with reason. Further possible embodiments, developments and implementations of the presently disclosed subject matter also include combinations not explicitly stated of features of the presently disclosed subject matter that have been described above or are described hereinafter in relation to the working examples. In particular, the skilled person will also add individual aspects as improvements or additions to the respective basic form of the presently disclosed subject matter.

EXAMPLES

A mortar formulation for cementitious 1-component waterproofing slurry with a high polymer fraction using an inventive binder system is compared below with 4 mortar formulations from the prior art (Comparative Examples Comp. 1 to 4).

The compositions are discussed in detail hereinafter. The compositions of HAC 1, HAC 2 and OPC can be taken from Table 1.

Example 1

Cementitious 1-Component Mortar Formulation with a Polymer Fraction >30 wt % with Inventive Binder System Based on Two HACs and Sulfate Carrier Comp. 1:
Cementitious 1-component mortar formulation with a polymer fraction >30 wt % with ternary binder system (OPC dominant) based on OPC, HAC and sulfate carrier, modelled on the guideline formula from BASF.
BASF Guideline Formula (Polymer/Cement Ratio 1.0; Fresh Bulk Density 1310 kg/Dm$^3$) for Comp. 1, Reported in Parts by Weight of Dry Component
  260.0 ACRONAL® P5033
  220.0 CEM I 52.5 N (Mielke) (cement)
  30 Istra 40
  491 Silica sand F 36
  15 Calcium sulfate
  1 Lithium carbonate
  0.9 Citric acid
  0.6 Tartaric acid
  5 Calcium hydroxide
  4 VINAPOR® DF 9010 F (defoamer)
  2.8 RHEOVIS® HS 1980 F (rheology modifier)
  260 Water
ACRONAL® P5033 is a redispersible, crosslinking polymer powder, based on an aqueous anionic copolymer dispersion of acrylic ester and styrene, which is free from plasticizers, ammonia and alkylphenol ethoxylates.
Comp. 2:
Cementitious 1-component mortar formulation with a polymer fraction of 30 wt % with pure OPC binder system.
Comp. 3:
Cementitious 1-component mortar formulation with a polymer fraction of >30 wt % with a binary binder system based on an ettringite-forming HAC and sulfate carrier.
Comp. 4:
Cementitious 1-component mortar formulation with a polymer fraction of >30 wt % with a ternary binder system (HAC dominant) based on a conventional HAC, OPC and sulfate carrier.

Table 2 below compiles the composition of the mortar formulations according to Examples 1 to 3 and Comparative Examples 1 to 4, the numerical values being stated in wt %.

The overall polymer fraction here includes all polymeric constituents present in the dry mortar formulation. The majority of this is redispersible dispersion powder. This may comprise copolymers based on acrylic esters and styrene or, alternatively, polymers based on vinyl compounds and ethylene. Additionally present may be polymer fibers (PE, PP). Rheologically active formulation ingredients present may include cellulose ethers, starch ethers, or thickeners.

TABLE 1

Mortar Formulations/Binder Compositions

|  | Example 1 | Example 2 | Example 3 | Comp. 1 | Comp. 2 | Comp. 3 | Comp. 4 |
|---|---|---|---|---|---|---|---|
| Composition of the binder system | Inventive binder system |  |  | Ternary binder system | OPC system | Binary binder system | Ternary binder system |

TABLE 1-continued

Mortar Formulations/Binder Compositions

|  | Example 1 | Example 2 | Example 3 | Comp. 1 | Comp. 2 | Comp. 3 | Comp. 4 |
|---|---|---|---|---|---|---|---|
| Description of comparable systems |  |  |  | (OPC dom.) Modelled on BASF guideline formula |  | (HAC) DE 60304041 | (HAC dom.) |
| Binder system |  |  |  |  |  |  |  |
| HAC 1 (for composition see Table 1) [wt %] | 12 | 15 | 12 | 10 |  |  | 12 |
| HAC 2 (for composition see Table 1) [wt %] | 6 | 4 | 6 |  |  | 14 |  |
| Sulfate carrier (calcium sulfate hemihydrate/ $CaSO_4 \cdot 0.5\ H_2O$) [wt %] | 3 | 2 | 3 | 3 |  | 7 | 5 |
| OPC (for composition see Table 1) [wt %] |  |  |  | 16 | 21 |  | 4 |
| Polymer |  |  |  |  |  |  |  |
| Redispersible dispersion powder based on a copolymer of styrene and acrylic ester [wt %] | 36 | 36 | 36 | 35 | 30 | 36 | 36 |
| Other ingredients |  |  |  |  |  |  |  |
| Filler (quartz aggregate 0.1-0.3 mm) [wt %] | 40 |  |  | 34 | 48.9 | 40 | 40 |
| Retardant (fruit acid) [wt %] |  |  |  | 0.2 | 0.1 |  |  |
| Additives (e.g., cellulose ethers) [wt %] | 3 | 3 | 2.8 | 1.8 |  | 3 | 3 |

A comparison of the exemplary cementitious 1-component mortar formulation of EXAMPLE 1 with the commercially available comparative products in Table 3 shows the advantages of the inventive binder system used.

The working time was determined using the IP8 ultrasonic measuring system from Ultratest GmbH, Germany. The working time was found here to be as reported in Table 3. The working time here means the time between contacting of the dry mortar with water and the time at which the mortar can no longer be reliably worked, i.e. until it loses its workable consistency as a result of the ensuing reaction.

Foot-traffic accessibility and the time before second application were determined manually. Foot-traffic accessibility can be determined on the surface by cautious treading and a rotary movement of the foot. If the surface is undamaged, or if no removal of material is observed, foot-traffic accessibility has been attained. For the stated examples, the product is applied in a film thickness of 1 mm.

The time until application of a second coat is determined likewise manually. When this point in time is reached, the first layer is no longer damaged when the mortar is applied further by means of a trowel.

TABLE 2

Working Time and Time to Foot-traffic Time and Time for Application the Second Coat for EXAMPLE 1 and for the Comparative Formulations (Comp. 1 to Comp. 4)

|  | Example 1 | Comp. 1 | Comp. 2 | Comp. 3 | Comp. 4 |
|---|---|---|---|---|---|
| Working time |  |  |  |  |  |
| 10° C./84% RH | 1.5 h | 2.5 h | 6 h | — | — |
| 23° C./50% RH | 50 min | 5 min | 4.5 h | 3 h | 5 h |
| Foot-traffic time (film thickness 1 mm) |  |  |  |  |  |
| 10° C./84% RH | 5 h | 8 h | 10 h | — | — |
| 23° C./50% RH | 2 h | 3 h | 3.5 h | 3.5 h | 4.5 h |
| Application of $2^{nd}$ coat |  |  |  |  |  |
| 10° C./84% RH | 5.5 h | 10 h | 12 h | — | — |
| 23° C./50% RH | 2.5 h | 4 h | 4.5 h | 4 h | >24 h |

Relative to the pure OPC system (Comp. 2), the example formulation shows a practical working time of around 50 minutes, and also a good hardening reaction (around 2 hours). Accordingly, foot-traffic accessibility is attained earlier, and a second coat can be applied around 2 hours earlier. As shown by means of the above-indicated ultrasound investigations of the hardening profile in FIG. 1, Comp. 2 is observed to show no reaction for a very long time, corresponding to an unchanging sonic speed.

Relative to the pure OPC system (Comp. 2), the OPC-dominated, ternary binder system of formulation Comp. 1 shows a shortening of the times before the surfaces can be walked on and reworked, as apparent from Table 3. The addition of high-alumina cement and sulfate carrier accelerates the hydration reaction of the OPC, thereby partly compensating for the retarding effect of the high polymer fraction. This is also apparent from the ultrasound investigations in FIG. 1. There, a continuous rise in the velocity of sound can be observed. Relative to Comp. 2, this can probably be attributed in the Comp. 1 system to the formation of hydration products. Nevertheless, Comp. 1 does not attain the properties of the inventive formulation of the example. Both the time before foot-traffic accessibility and also the time before reworking are longer than for the innovative ternary binder system. Again, under adverse ambient conditions, a slowdown is observed in the setting reaction of the system, as is evident from a comparison of the time to reworking at RT (23° C.)->10° C.: invention: 220%/Comp. 1: 250%. Another disadvantage of the system of Comp. 1 is the short working time of around 35 minutes.

This is impractical in the case of large-area applications (initial working, working into one another) and in the case of complex constructional geometries. An extension to the working time (retardation) adversely affects the through-cure parameters ($2^{nd}$ coat foot-traffic accessibility).

In a further comparison, the formulation of the inventive example is contrasted with binder compositions known according to the prior art (Comp. 3 and Comp. 4).

The system of Comp. 3 is based on the innovative HAC 2, which by virtue of its chemical/mineralogical composition is able, in combination with a sulfate carrier, to form the principal hydration product ettringite (see also FR2839066 or DE60304041). A feature of such binder systems is a very rapid hydration reaction, particularly on dense substrates. In systems with a polymer content <20 wt % (max. about 15 wt %), the working time, owing to the high reactivity of the HAC, is situated, for example, at around 10 minutes, and in thin films it is possible to commence reworking after just 60 minutes, for example. If this binder combination is used in systems with a polymer content >20 wt %, there is a retardation of the setting reaction of the system, as evident from FIG. 2. The ultrasound results reveal that, in particular, the working time is significantly prolonged. Also, surprisingly, it is not possible to achieve a practical shortening in the working time by varying the HAC 2/sulfate carrier ratio.

Figure 2:
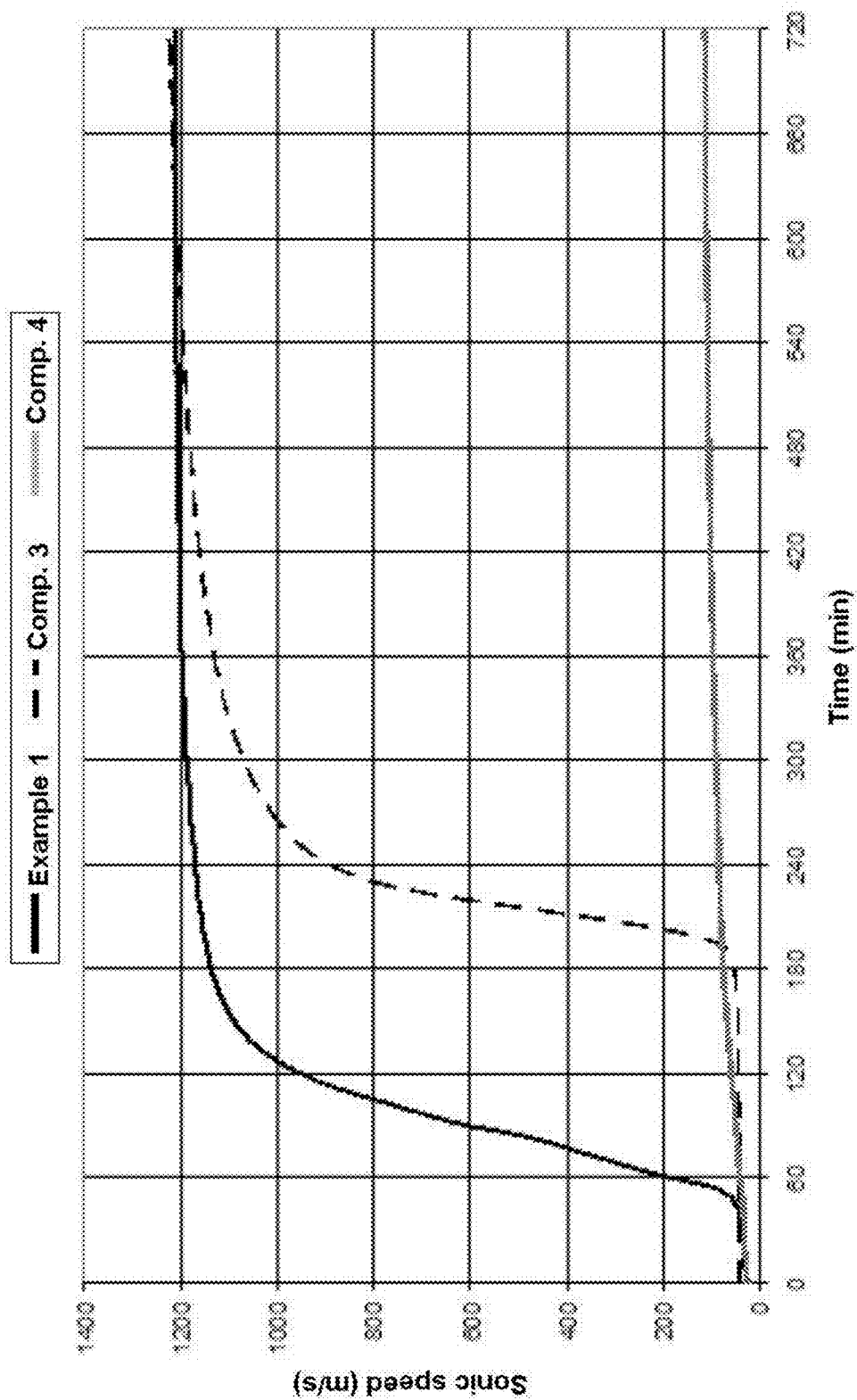
FIG. 2 shows the results of ultrasound investigations on the hardening profile of the inventive example (black line) in relation to Comparative 3 (dashed line) and Comparative 4 (gray line).

Surprisingly, a significantly reduced reactivity was also found for ternary binder systems known from the prior art (HAC dominant; Comp. 4) when used in 1-component mortar formulations with a polymer fraction >20 wt %. In the ultrasound investigations, a result was observed which is comparable with that of the pure OPC system, as shown in FIG. 2. Although binder combinations according to Comp. 4 are also used generally in systems with an elevated polymer fraction (>5 wt %; <15 wt %), the hydration reaction comes virtually to a standstill, owing to the polymer fraction going beyond this. Comp. 4 itself, without additional retardation, does not exhibit sufficient hardening on the surface after 24 hours. Using the known ternary binder systems, the reactivity of the inventive binder combination cannot be achieved in formulations with a polymer fraction >20 wt %.

As far as practical application is concerned, the working time, as well as the hardening, is an important criterion. The comparative examples presented according to the prior art give working times that are either too long (Comp. 2) or too short (Comp. 1). Shortening the working times is difficult to implement reproducibly. A prolongation, with addition of customary retardants which are normally used, results in a further-retarded hydration reaction. With the other comparative examples as well (Comp. 3 and Comp. 4), it was not possible to bring about a practical working time.

Figure 3:
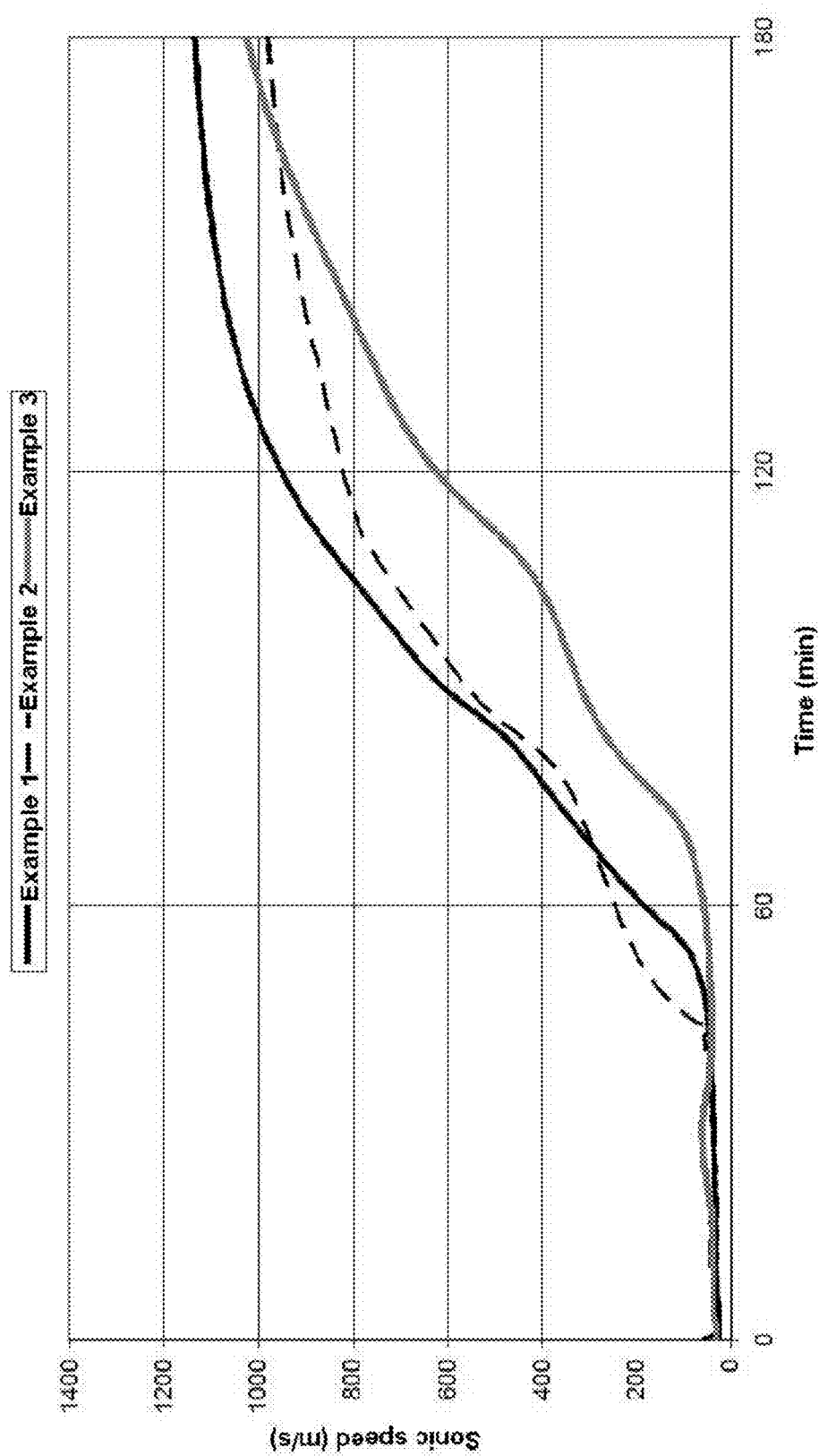
FIG. 3 shows the results of ultrasound investigations on the hardening profile of Inventive Example 1 (black line), Example 2 (dashed line), and Example 3 (gray line).

With the innovative, Portland cement-free binder system, formulations are possible with working times that can be adjusted from around 20 minutes (Example 2) to 60 minutes (Example 3), without any significant change in the further setting reaction, as evident from FIG. 3. Setting the working time can be done either via a change in the binder proportions or by addition of retardants known according to the prior art (see, for example, H. Kittel, Lehrbuch der Lacke and Beschichtungen, Volume 7, Produkte für das Bauwesen, Beschichtungen, Bauklebstoffe, Dichtstoffe, pp. 100-101, S. Hirzel Verlag Stuttgart, $2^{nd}$ edition, 2004).

The innovative binder combination consisting of a blend of the two high-alumina cements (for example in a range from 4:1 to 1:2 for the HAC1:HAC2 weight ratio, for example 2:1) and of the sulfate carrier exhibits surprisingly, in spite of the high polymer fraction of >30 wt %, very rapid through-curing in conjunction with a practical, sufficient working time.

Through the combination of the high-alumina cements it is possible to achieve a significant reduction in the retarding effect, caused by the high polymer content.

Through the combination of a conventional HAC, a sulfate carrier and an ettringite-forming binder (HAC 2), a rapid hydration reaction can be achieved for systems including those having a polymeric fraction >20 wt %, and the working times can be made sufficiently long.

The setting reaction of the binder systems cited according to the prior art, in the comparative examples, is significantly retarded because of the high polymer fraction. This is particularly disadvantageous for products which must be processed with a two-fold application. This applies to the majority of cementitious 1-component mortar systems with a high polymer fraction, especially in the case of assembly sealing applications. A second application can be made only after the first coat has dried, so that the first coat is not damaged and its functionality is not impaired.

In purely OPC-based systems, the hydration reaction comes virtually to a standstill, owing to the high polymer fraction. As a result of the polymers employed (acrylate copolymers, polyvinyl alcohol as protective colloid), the possibility is provided of complexing of the ions (including $Ca^{2+}$) needed for hydration, and passivation of the reactive cement particle surfaces through adsorption.

The foot-traffic accessibility of such systems is extended, and the application of a second coat as well is significantly retarded. These effects are reinforced further under adverse ambient conditions (low temperature, high relative humidity). Accelerating the hydration reaction is possible only to a limited extent. In pure OPC systems, calcium silicate hydrate phases (C-S-H phases) constitute the principal hydration products, and not ettringite as in ternary systems. The formation of ettringite can be tailored by varying the concentrations of ions. Accordingly, the hardening is more a process of physical drying than a cementitious hydration reaction.

Ternary binder systems consisting of OPC (principal binder), HAC and a sulfate carrier are likewise strongly influenced in their hydration by the high polymer fraction. Relative to pure OPC systems, the time periods prior to foot-traffic accessibility and application of a second coat are significantly shortened. Such systems, however, also exhibit a very short working time, which in turn is a disadvantage in the context of application to difficult geometries and large surface areas ("working into one another"). These ternary binder systems also exhibit disadvantages under adverse ambient conditions. Here, the times before foot-traffic accessibility and also before reworking are significantly prolonged (+250%).

What is claimed is:
1. A mineral binder system comprising:
    i) a mineral binder B1 of calcium aluminates, having a ratio C/A of calcium oxide C to aluminum oxide A of 0.7 to 1.1;
    ii) a mineral binder B2 of calcium aluminates, having a ratio C/A of calcium oxide C to aluminum oxide A of 1.2 to 2.7; and
    iii) at least one sulfate carrier.
2. The mineral binder system of claim 1, wherein the mineral binder B1 comprises calcium oxide in an amount of 30 to 42 wt %, based on the mineral binder B1.
3. The mineral binder system of claim 1, wherein the mineral binder B2comprises calcium oxide in an amount of 45 to 65 wt %, based on the mineral binder B2.
4. The mineral binder system of claim 1, wherein the mineral binder system is free from Portland cement.
5. The mineral binder system of claim 1, wherein the sulfate carrier comprises at least one gypsum modification.
6. The mineral binder system of claim 1, wherein the mineral binder system comprises at least one element of the group selected from (i) 40 to 80 wt % of the mineral binder B1, (ii) 10 to 40 wt % of the mineral binder B2, and (iii) 10 to 20 wt % of the sulfate carrier, based on the total weight of the mineral binder system, the total weight of mineral binder B1 and mineral binder B2 and sulfate carrier accounting for not more than 100 wt %.

7. The mineral binder system of claim 5, wherein the at least one gypsum modification is selected from the group consisting of calcium sulfate dihydrate, calcium sulfate α-hemihydrate, calcium sulfate β-hemihydrate, and calcium sulfate anhydrite, or any combination thereof.

8. A dry mortar comprising the mineral binder system of claim 1, polymers, and optionally fillers or rheological additives or a combination thereof.

9. The dry mortar of claim 8, wherein the polymer fraction of the dry mortar accounts for at least 20 wt %, based on the dry mortar.

10. The dry mortar of claim 8, wherein up to 50 wt %, based on the dry mortar system, of at least one redispersible polymer dispersion powder are present as polymer.

11. The dry mortar of claim 10, wherein the at least one redispersible polymer dispersion powder comprises a copolymer based on acrylic ester and styrene or a polymer based on a vinyl compound and ethylene or a combination thereof.

12. The dry mortar of claim 8, further comprising polymer fibers based on polyethylene or polypropylene or a combination thereof.

13. The dry mortar of claim 8, the rheological additives comprising at least one additive selected from the group consisting of cellulose ethers, starch ethers and thickeners.

14. The dry mortar of claim 8, wherein the dry mortar is free from Portland cement.

15. A dry mortar prepared by a method comprising mixing the dry mortar of claim 8 with water and optionally sand.

16. A method for preparing a dry mortar, the method comprising mixing one or more polymers, fillers, rheological additives, or a combination thereof with:
  (i) a mineral binder system comprising a mineral binder B1 of calcium aluminates, having a ratio C/A of calcium oxide C to aluminum oxide A of 0.7 to 1.1;
  (ii) a mineral binder B2 of calcium aluminates, having a ratio C/A of calcium oxide C to aluminum oxide A of 1.2 to 2.7; and
  (iii) at least one sulfate carrier,
wherein a dry mortar is prepared.

17. The method of claim 16, wherein said dry mortar prepared is a tile adhesive mortar, a levelling compound, a waterproofing slurry, a grout mortar, a screed binder, a screed mortar, a repair adhesive, or a and damp proof membrane, or is one component thereof.

18. A tile adhesive mortar, levelling compound, waterproofing slurry, grout mortar, screed binder, screed mortar, repair adhesive, or damp proof membrane comprising the mineral binder system of claim 1.

19. A tile adhesive mortar, levelling compound, waterproofing slurry, grout mortar, screed binder, screed mortar, repair adhesive, or damp proof membrane comprising the dry mortar of claim 8.

20. A tile adhesive mortar, levelling compound, waterproofing slurry, grout mortar, screed binder, screed mortar, repair adhesive, or damp proof membrane comprising the dry mortar of claim 15.

* * * * *